United States Patent [19]

Shtarkman

[11] 4,352,487
[45] Oct. 5, 1982

[54] VISCOUS SPRING DAMPER

[75] Inventor: Emile M. Shtarkman, Norwalk, Ohio

[73] Assignee: Gould Inc., Rolling Meadows, Ill.

[21] Appl. No.: 207,909

[22] Filed: Nov. 18, 1980

[51] Int. Cl.³ .............................. F16F 3/08; F16F 9/04
[52] U.S. Cl. ..................................... 267/35; 248/562;
        248/634; 267/8 R; 267/140.1; 280/697
[58] Field of Search ..................... 188/298; 267/140.1,
        267/141, 141.1, 113, 35, 63 A, 152, 8 R;
        248/562, 634; 280/697

[56] References Cited
U.S. PATENT DOCUMENTS

| 2,545,857 | 3/1951 | Perkins et al. | 31/86 |
| 2,818,249 | 12/1957 | Boschi | 267/33 |
| 3,509,795 | 5/1970 | Woodward | 92/92 |
| 3,658,314 | 4/1972 | Luzsicza | 267/121 |
| 3,701,322 | 10/1972 | Carle | 105/197 |
| 3,717,105 | 2/1973 | Novotny | 105/197 |
| 3,941,149 | 3/1976 | Mittleman | 137/493.1 |
| 4,054,152 | 10/1977 | Ito et al. | 137/512 |
| 4,126,084 | 11/1978 | Inada et al. | 91/443 |
| 4,161,304 | 7/1979 | Brenner et al. | 248/562 |
| 4,234,172 | 11/1980 | Takahashi | 188/298 X |
| 4,271,869 | 6/1981 | Weidl et al. | 188/298 |

FOREIGN PATENT DOCUMENTS

| 2253269 | 10/1972 | Fed. Rep. of Germany . | |
| 2639452 | 3/1978 | Fed. Rep. of Germany | 267/35 |
| 1152494 | 2/1958 | France . | |
| 942729 | 11/1963 | United Kingdom . | |

Primary Examiner—George E. A. Halvosa
Attorney, Agent, or Firm—Russell E. Baumann

[57] ABSTRACT

A viscous spring damper including inner and outer members connected by an elastomeric shear spring and having a main or first fluid chamber disposed therebetween for communication with a second fluid chamber in the inner member through a restricted orifice. The inner and outer members are relatively movable for stressing the shear spring and varying the volumes of the chambers while fluid is transferred therebetween through the restricted orifice. An elastomeric bladder within the second fluid chamber is selectively chargeable with gas pressure for calibrating the damping characteristics, varying the initial spring rate or leveling a vehicle on which the damper is installed. An elastomeric diaphragm is included in the main fluid chamber for providing a selectively chargeable diaphragm gas chamber. Integrally formed wear ribs in the diaphragm minimize diaphragm abrasion effects at points of engagement between the diaphragm and the inner member and preclude an hydraulic lock between the diaphragm and the inner member.

5 Claims, 6 Drawing Figures

VISCOUS SPRING DAMPER

BACKGROUND OF THE INVENTION

The present invention relates generally to shock absorbers. More particularly, it relates to shock absorbers of the type which are mounted to vehicles and which use both an elastomeric shear spring and flow of fluid through a restricted orifice for absorbing shock, structural leveling and energy dissipation. Known shock absorbers of the type described include application Ser. No. 950,949, filed Oct. 13, 1978 now abandoned, in the name of L. Dale Coad.

In the Coad application an expandible and contractible elastomeric bladder for separating a gas chamber from a fluid chamber in a viscous spring damper was provided for varying the spring rate of the damper, calibrating the damper or leveling a load supported thereby.

Dynamic operating characteristics of such dampers are chiefly limited to spring rate, damping response, cyclical active energy consumption and the dissipation percentage thereof. In prior art devices utilizing a single bladder, force-deflection dynamic testing has established that such a device has a sharply variable spring characteristic (spring rate) in compression. In addition, such a device has limitations in damping response and frequency range in compressive motion and in rebound motion reacts as a device with irregular types of damping dependent on load and frequency. Prior art devices have also suffered from a rapidly increasing spring rate as deflection of such a device increases, thereby giving a rough ride to a vehicle containing such devices and incurring high deflection shocks.

The present invention contemplates a new and improved viscous spring damper which exhibits improved operating characteristics over prior viscous spring dampers and which is simple in design, economical to manufacture, readily adaptible to a plurality of energy dissipation uses, easy to install, easy to remove and which provides improved shock absorption and energy dissipation.

BRIEF SUMMARY OF THE INVENTION

In accordance with the present invention, there is provided a viscous spring damper particularly suited for shock absorption, damping, leveling structural agitation and energy dissipation. The new viscous spring damper is generally comprised of an outer member connected by an elastomeric shear spring to an inner member. A main or first fluid chamber is disposed between the inner and the outer members and communicates with a second fluid chamber through restricted orifice means. An expandible and contractible gas chargeable elastomeric bladder is included in the second chamber, with a first valve means for selectively charging the bladeer with gas pressure. An elastomeric diaphragm is included in the main fluid chamber with a second valve means for selectively charging the diaphragm with gas pressure.

In accordance with another aspect of the invention, the diaphragm is interposed between the inner member end wall and the outer member end wall, and is bonded to the peripheral wall of the outer member.

In accordance with yet another aspect of the present invention, the diaphragm includes a plurality of spaced outwardly extending wear ribs disposed to engage points of engagement on the diaphragm.

It is a principal object of the present invention to provide an improved viscous spring damper having improved operating characteristics.

It is another object of the invention to provide an improved viscous spring damper having a diaphragm for separating a gas chamber from a fluid chamber.

Other objects and advantages for the subject new viscous spring damper will become apparent to those skilled in the art upon a reading and understanding of this specification.

BRIEF DESCRIPTION OF THE DRAWINGS

The invention may take physical form in certain parts and arrangement of parts, the preferred embodiment of which will be described in detail in the specification and illustrated in the accompanying drawings which form a part hereof and wherein.

DETAILED DESCRIPTION OF THE INVENTION

Figure 1:
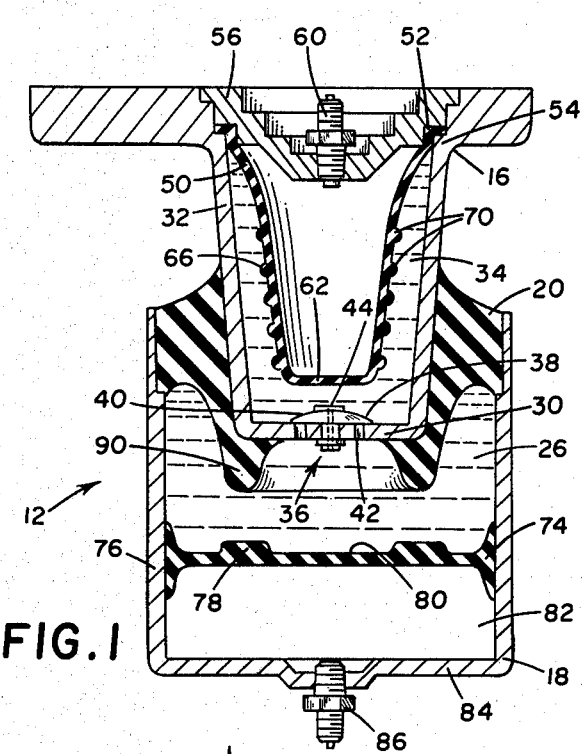
FIG. 1 is a cross-sectional elevational view of a viscous spring damper constructed in accordance with the present invention.

Referring now to the drawings wherein the showings are for purposes of illustrating the preferred embodiment of the invention only and not for purposes of limiting the same, the FIGURES show a viscous spring damper 12 comprising of an inner member 16 and an outer member 18 connected by elastomeric shear spring 20 which is bonded to a portion of the surfaces of the inner and outer members. A main fluid chamber 26 is disposed intermediate inner member 16 and outer member 18 and is at least partially contiguous with elastomeric shear spring 20.

Inner member 16 includes an elongated cup-like portion including an end wall 30 and a peripheral wall 32 extending therefrom to enclose an elongated second fluid chamber 34. Orifice means generally indicated at 36 is provided for transferring fluid between fluid chambers 26 and 34. Typically orifice means 36 comprises an elastomeric restrictor 38 having a yieldable flap 40 covering a plurality of passageways 42 for blocking flow therethrough in one direction while providing flow in a reverse direction therethrough and through a central passageway 44.

An elongated expandible and contractible elastomeric bladder 50 is positioned within second fluid chamber 34, and has a circumferential mounting flange 52 secured between a circumferential shoulder 54 on inner member 16 and a cap member 56 which is press-fit or otherwise suitably secured to inner member 16. Cap member 56 has a valve means in the form of an air check valve 60 mounted thereon for selectively charging bladder 50 with variable gas pressure. Bladder 50 is shaped to generally conform with the shape of second fluid chamber 34, and includes a bladder end wall 62 facing inner member end wall 30, and a bladder peripheral wall 66 facing inner member peripheral wall 32.

Bladder 50 has a plurality of spaced wear means thereon for minimizing abrasion of the bladder. This makes it possible to omit machining of the interior of second fluid chamber 34. The wear means may take different forms and in one arrangement, comprises a plurality of axially spaced outwardly projecting circumferential rings 70 integral with bladder peripheral wall 66. Bladder end wall 62 may also be substantially thicker than the remainder of the bladder to provide abrasion resistance. When bladder 50 expands and contracts, it rubs against the interior of inner member end wall 30 and peripheral wall 32, and wear means 70 minimizes any danger of rupturing the bladder. Rings 70 are sufficiently close together, and the bladder wall therebetween is sufficiently thick, to prevent the bladder from bulging outwardly between adjacent rings into contact with the surface of inner member peripheral wall 32. Circumferential rings 70 also trap fluid therebetween for maintaining lubricant along the peripheral wall of bladder 50 to further minimize abrasion thereof.

Figure 2:
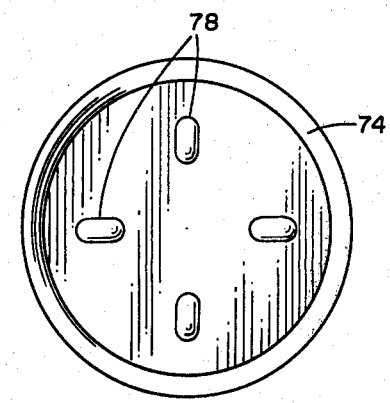
FIG. 2 is a top plan view of a diaphragm utilized in conjunction with the present invention.

Elastomeric diaphragm 74 is preferably bonded to the peripheral wall 76 of outer member 18 and generally is constructed of the same material as is bladder 50. Outwardly extending ribs 78 (FIGS. 1 and 2) are integrally formed in diaphragm 74 in diaphragm wall 80 facing inner member 16 and are positioned to engage points of contact between diaphragm 74 and elastomeric shear spring 20 to inhibit damaging abrasions and provide fluid ports to preclude an hydraulic lock between the inner member 16 and the diaphragm 74. Main fluid chamber 26 is defined between diaphragm 74 and shear spring 20. Diaphragm gas chamber 82 is defined between diaphragm 74, peripheral wall 76 and outer member end wall 84. Air check valve 86 is mounted in end wall 84 for selectively charging chamber 82 with variable gas pressure for leveling the damper or varying the spring rate. References to a gas in this application are meant to define a gas such as air or nitrogen. References to a fluid are meant to define a liquid, such as glycol or other such hydraulic fluid.

Bumper stop means in the form of elastomeric ring 90 is integrally formed to elastomeric shear spring 20 within main fluid chamber 26. Bumper stop ring 90 may also be attached to end wall 30 in any suitable manner, including mold bonding, mechanical fasteners or a chemical adhesion.

OPERATION

The viscous spring damper 12 may be used as a shock absorber on vehicles, or on machinery supports or the like. When used on vehicles, inner member 16 is connected directly or indirectly with the vehicle body (not shown), while outer member 18 is connected either directly or indirectly to the vehicle axle (not shown). Relative telescoping axial movement between inner and outer members 16, 18 stresses elastomeric shear spring 20, and varies the volumes of fluid chambers 26, 34 while fluid is transferred therebetween through orifice means 36.

Figure 3:
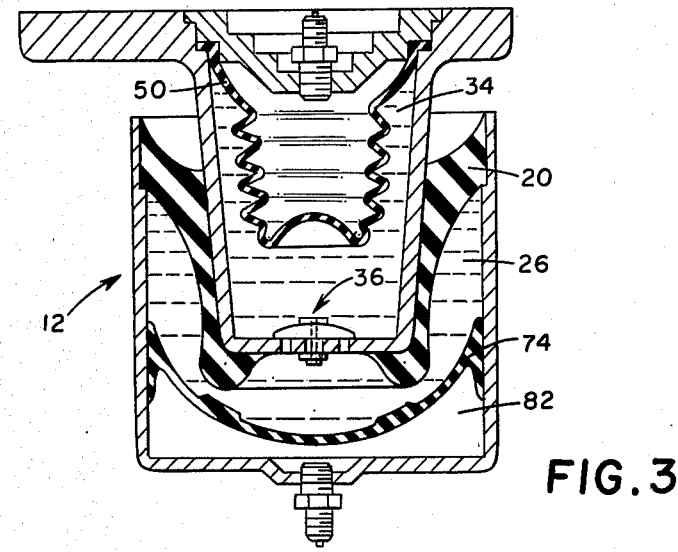
FIG. 3 is a cross-sectional elevational view of a viscous spring damper constructed in accordance with the present invention showing the damper in a compressed state.

With particular attention to FIG. 3, when the inner and outer members quickly receive telescoping force, the elastomeric diaphragm 74 and the diaphragm gas chamber 82 are first compressed. This is due to the large surface area of diaphragm 74 and the relatively small area of passageway for fluid in orifice means 36 to allow fluid into second fluid chamber 34. As telescoping continues fluid flows into second chamber 34 and compresses bladder 50. The initial compression of the diaphragm with a relatively small fluid flow through orifice means 36 exhibits a damping response to the force inflicted as well as a spring rate response. Further telescoping stresses shear spring 20 and further compresses diaphragm gas chamber 82 and bladder 50. This action absorbs shock and dissipates energy in a known manner.

Figure 4:
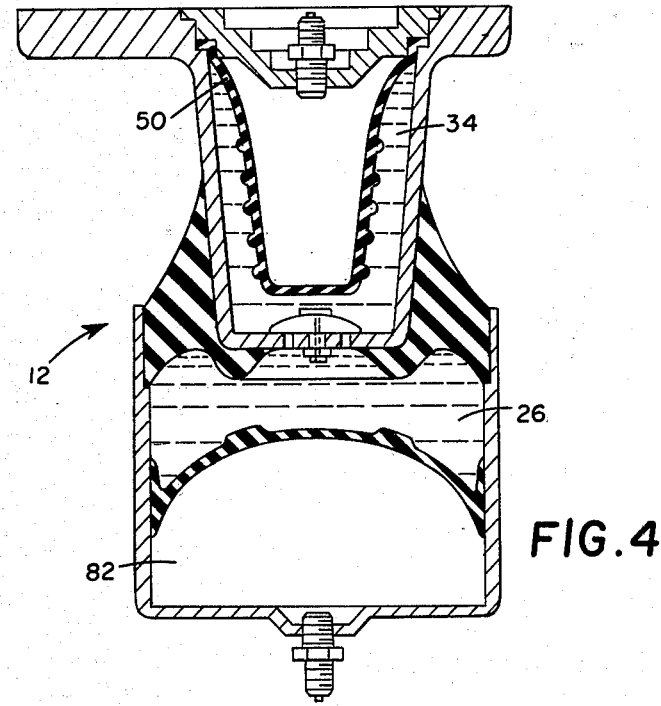
FIG. 4 is a cross-sectonal elevational view showing the spring damper in an expanded state.

During rebound motion of the damper 12, fluid flows back through orifice means 36 from second chamber 34 to main fluid chamber 26. When the damper 12 is expanded (FIG. 4), the diaphragm gas chamber 82 and bladder 50 are expanded and fluid is drawn into the main fluid chamber 26 from the second chamber 34.

The dynamic operative action of a viscous spring damper including a diaphragm 74 has been found to exhibit two spring rates, one during compression and another during rebound motion. In addition, in both compressive and rebound motion the invention shows a positive damping response.

Figure 5:
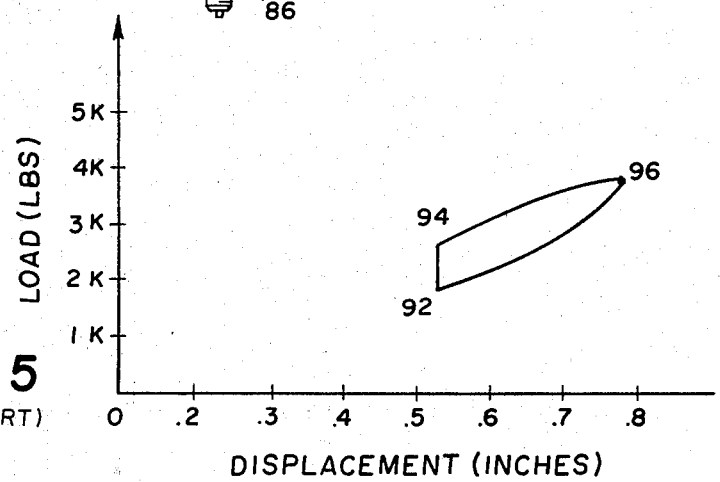
FIG. 5 is a graph showing the deflection characteristics of a prior art device.
Figure 6:
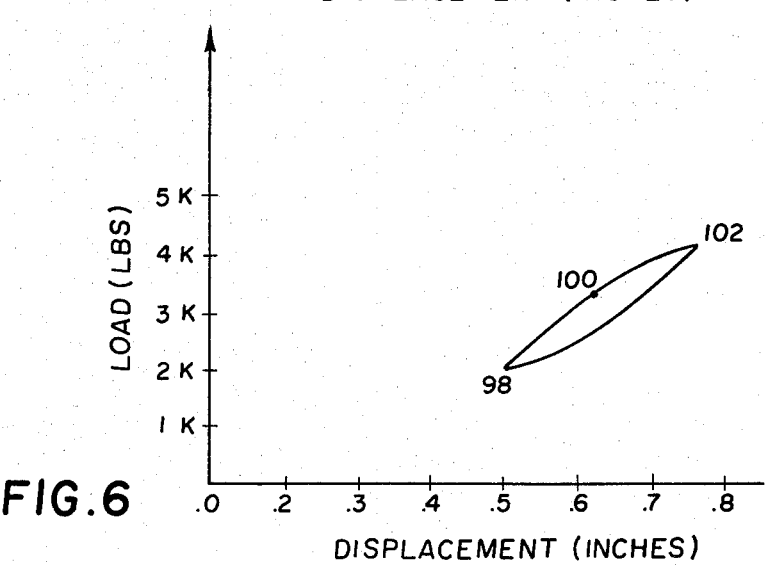
FIG. 6 is a graph showing the deflection characteristics of the spring damper of FIG. 1.

With particular attention to FIGS. 5 and 6, the improved operating characteristics are illustrated. In prior art devices not incorporating a diaphragm, the load/displacement graph (FIG. 5) takes an irregular slope from point 92 to point 94 to point 96 during compressive telescoping movement. Particularly during initial loading (point 92 to point 94) the graph shows little displacement for an increase in load. This indicates a very high spring rate and no damping.

Under identical conditions, the subject invention shows a smooth load/displacement curve during loading from point 98 to point 100 to point 102 and during rebound from point 102 to point 98. This indicates damping and spring rate in both telescoping and rebound.

The invention has been described with reference to the preferred embodiment. Obviously, modifications and alterations will occur to others upon reading and understanding of the specification. It is our intention to include all such modifications and alterations insofar as they come within the scope of the appended claims or the equivalence thereof.

Having thus described our invention, we now claim:

1. In a viscous spring damper including inner and outer members connected by an elastomeric shear spring, having a main fluid chamber therebetween communicating with a second chamber in said inner member through restricted orifice means, and having an expandible and contractible gas chargeable elastomeric bladder in said second chamber, and a first valve means for selectively charging said bladder with gas pressure, the improvement comprising: an elastomeric diaphragm in said main fluid chamber having means associated therewith for providing fluid ports between said diaphragm and said inner member, said inner member having stop means extending therefrom towards said outer member and wherein said stop means are positioned for engaging said means on said diaphragm during telescoping movement of said members, and a second valve means for selectively charging said diaphragm with gas pressure whereby relative movement between said members operates to stress said shear spring and vary the volumes of said bladder and said diaphragm.

2. The viscous spring damper of claim 1 wherein said outer member has an end wall through which said second valve means extends and includes an elongated peripheral wall extending from said end wall in a direction towards said inner member, said main fluid chamber being defined within said end wall and said peripheral wall, and said diaphragm being interposed between said inner member and said end wall and configured to generally conform to the cross-sectional configuration of said main fluid chamber.

3. The viscous spring damper of claim 2 including a plurality of spaced outwardly extending wear means on said diaphragm for preventing abrasion thereof and for providing said fluid ports between said diaphragm and said inner member.

4. The viscous spring damper of claim 3 wherein said wear means comprises a plurality of radially extending ribs.

5. In a viscous spring damper including inner and outer members connected by an elastomeric shear spring, having a main fluid chamber therebetween communicating with a second chamber in said inner member through restricted orifice means, and having an expandible and contractible gas chargeable elastomeric bladder in said second chamber, and a first valve means for selectively charging said bladder with gas pressure, the improvement comprising: an elastomeric diaphragm in said main fluid chamber having rib means associated therewith for providing fluid ports between said diaphragm and said inner member with said inner member having bumper stop means extending therefrom towards said outer member and wherein said bumper stop means are positioned for engaging said rib means on said diaphragm during telescoping movement of said members, and a second valve means for selectively charging said diaphragm with gas pressure whereby relative movement between said members operates to stress said shear spring and vary the volumes of said bladder and said diaphragm.

* * * * *